United States Patent [19]
Tanaka et al.

[11] Patent Number: 5,893,143
[45] Date of Patent: Apr. 6, 1999

[54] PARALLEL PROCESSING UNIT WITH CACHE MEMORIES STORING NO-OP MASK BITS FOR INSTRUCTIONS

[75] Inventors: Kazuhiko Tanaka, Fujisawa; Keiji Kojima, Sagamihara; Kiyokazu Nishioka, Odawara; Tohru Nojiri, Kawasaki; Yoshifumi Fujikawa; Masao Ishiguro, both of Yokohama, all of Japan

[73] Assignee: Hitachi, Ltd., Tokyo, Japan

[21] Appl. No.: 667,670

[22] Filed: Jun. 21, 1996

[30] Foreign Application Priority Data

Jun. 28, 1995 [JP] Japan .................................. 7-161738

[51] Int. Cl.⁶ .............................. G06F 12/08; G06F 9/30
[52] U.S. Cl. ......................... 711/120; 711/125; 711/128; 395/800.24; 395/391
[58] Field of Search ............................... 395/391, 800.23, 395/800.24; 711/125, 120, 128, 119

[56] References Cited

U.S. PATENT DOCUMENTS

| 4,833,599 | 5/1989 | Colwell et al. | 395/800.24 |
| 5,051,885 | 9/1991 | Yates, Jr. et al. | 395/391 |
| 5,465,342 | 11/1995 | Walsh | 711/119 |
| 5,510,934 | 4/1996 | Brennan et al. | 711/119 |
| 5,574,939 | 11/1996 | Keckler et al. | 395/800.24 |
| 5,603,047 | 2/1997 | Caulk, Jr. | 395/800.23 |

OTHER PUBLICATIONS

Colwell, Robert et al. "A VLIW Architecture for a Trace Scheduling Compiler"; IEEE Transactions on Computers, vol. 37, No. 8, Aug. 1988; pp. 967–979.

Case, Brian. "Philips hopes to displace DSPs with VLIW: TriMedia processors aimed at future multimedia embedded apps."; Microprocessor Report; Dec. 5, 1994, v8 n16 p12(4).

"VLIW": The Wave of the Future?, Microprocessor Report, pp. 18–21, Feb. 14, 1994.

*Primary Examiner*—Reginald G. Bragdon
*Attorney, Agent, or Firm*—Fay Sharpe Beall Fagan Minnich & McKee

[57] ABSTRACT

Each processing unit 110a to 110d has an individual cache memory 100a to 100d. When the cache memories read an instruction from a main storage 5, an instruction field is distributed to the cache memories. Each cache memory is controlled by a common control circuit 20. A compiler operates to schedule the processes so as to focus the processes to be executed on a specific processing unit. According to the scheduled processes, the volumes of the cache memories 100a to 100d are specified according to each execution ratio of the corresponding processing units to the cache memories. In the foregoing arrangement, a processor provides the processing units controlled by a sole program counter and improves processing by improving the efficiency of the cache memory. Further, the processor improves the efficiency of the cache memory by deleting unnecessary codes.

1 Claim, 10 Drawing Sheets

ORIGINAL INSTRUCTION STRING ~700

INSTRUCTION STRING

| FIELD0-a | FIELD0-b | FIELD0-c | FIELD0-d |
|---|---|---|---|
| FIELD1-a | NOP | NOP | NOP |
| FIELD2-a | NOP | FIELD2-c | NOP |
| NOP | FIELD3-b | NOP | NOP |
| FIELD4-a | NOP | NOP | NOP |

↓

ON MAIN STORAGE ~710

INSTRUCTION FIELD ON MAIN STORAGE ~701

| FIELD0-a | FIELD0-b | FIELD0-c | FIELD0-d |
|---|---|---|---|
| FIELD1-a | FIELD2-a | FIELD2-c | NOP |
| FIELD3-b | FIELD4-a | | |

MASK INFORMATION ON MAIN STORAGE ~702

| 1111 | 1000 | 1010 | 1100 | 1000 |
|---|---|---|---|---|

↓

ON CACHE MEMORY ~720

MASK INFORMATION ON TAG MEMORY   INSTRUCTION FIELD ON INSTRUCTION CACHE

| Mask | Col1 | Col2 | Col3 | Col4 |
|---|---|---|---|---|
| 1111 | FIELD0-a | FIELD0-b | FIELD0-c | FIELD0-d |
| 1000 | FIELD1-a | | | |
| 1010 | FIELD2-a | | FIELD2-c | |
| 1100 | NOP | FIELD3-b | | |
| 1000 | FIELD4-a | | | |

SO ARE THE SELECTORS C AND D

PARALLEL PROCESSING UNIT WITH CACHE MEMORIES STORING NO-OP MASK BITS FOR INSTRUCTIONS

BACKGROUND OF THE INVENTION

1. Field of the Invention

The present invention relates to a processor, a coprocessor, and an expansion board having such processors mounted thereon which are used in an information processing apparatus such as a personal computer.

2. Description of the Related Art

Current processor architectures are directed to a reduced instruction sets computer (simply called a RISC system). The RISC system is characterized in that it does not contain complicated instructions and keeps its instructions constant in length. Since each instruction is simple, the RISC system offers a fast processing speed. Since each instruction has a constant length, the RISC system is enabled to read an instruction at one access to memory. These features enhance the processing speed.

In order to improve the processing performance of the RISC processor, the RISC processor employs a super scalar system as a current trend. The super scalar system is arranged so that operation units inside of the processor are dynamically scheduled on hardware when executing the operations. This system has a pro that it can use the conventional software resources without any change, while it has a con that it cannot use so much information for scheduling since the scheduling is done while it is being executed and thereby enhance its parallel level so much.

To achieve a higher performance than the super scalar system, there has been proposed a very long instruction word (simply called a VLIW system). This system is arranged to take the steps of statically scheduling the operation units contained in the processor on software when compiling the program, gathering a group of instructions to be executed in parallel as one instruction set, reading the instruction set at a time when the processor executes the program, and then executing the instruction set. The VLIW system does not need the hardware for the scheduling operation. Hence, it has a pro that the parallel level is increased. On the contrary, it has a con that an instruction length is made larger since plural instructions are gathered as one set.

The super scalar system and the VLIW system are introduced in "VLIW : The wave of the Future?" MICROPROCESSOR REPORT, pages 18 to 21, Feb. 14, 1994.

In general, a program contains a portion of high parallel level and a portion of low parallel level. A simple example of each portion will be described with reference to FIGS. 1 and 2. In these Figures, each row represents one process. For example, a first row process 800a shown in FIG. 1 indicates the flow of adding 1 to a content of a variable X0 and substituting the added result for a variable Y0. These processes are executed one by one.

Figure 1:
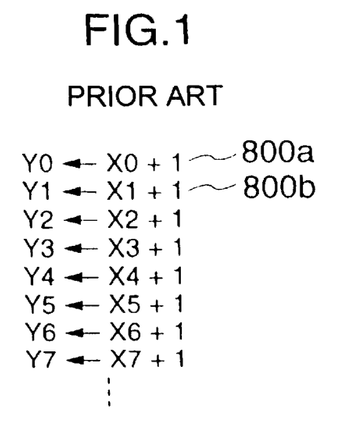
FIG. 1 is a view showing an example of a prior art processing portion of high parallel level.

FIG. 1 shows a portion of a high parallel level. In this portion, these processes are independent of one another, so that the processes are executed in parallel. For example, a value of a variable X1 used in a second row process 800b is determined before the execution of the first row process 800a. Hence, the first row process 800a and the second row process 800b are executed in parallel.

Figure 2:
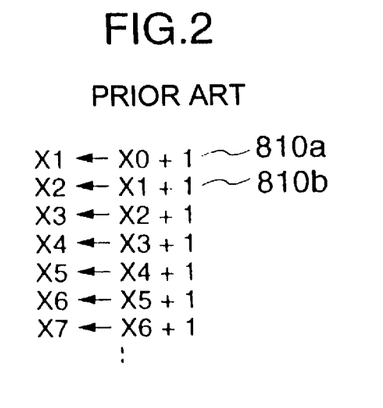
FIG. 2 is a view showing an example of a prior art processing portion of low parallel level.

On the other hand, FIG. 2 shows a portion of a low parallel level. In this portion, a value for each process is calculated by the one previous process. Hence, until the one previous process is terminated, the current process cannot be started. For example, a value of a variable X1 used in the second row process 810b cannot be defined until the execution of the first row process 810a. Normally, the second row process 810b is not allowed to start before the first row process 810a is terminated.

Figure 3:
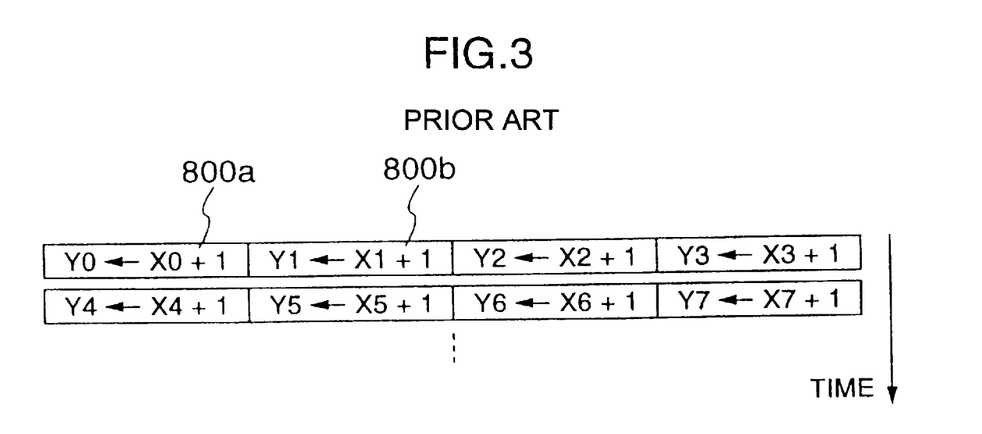
FIG. 3 is a view showing an example of a VLIW instruction corresponding to the prior art portion shown in FIG. 1.
Figure 4:
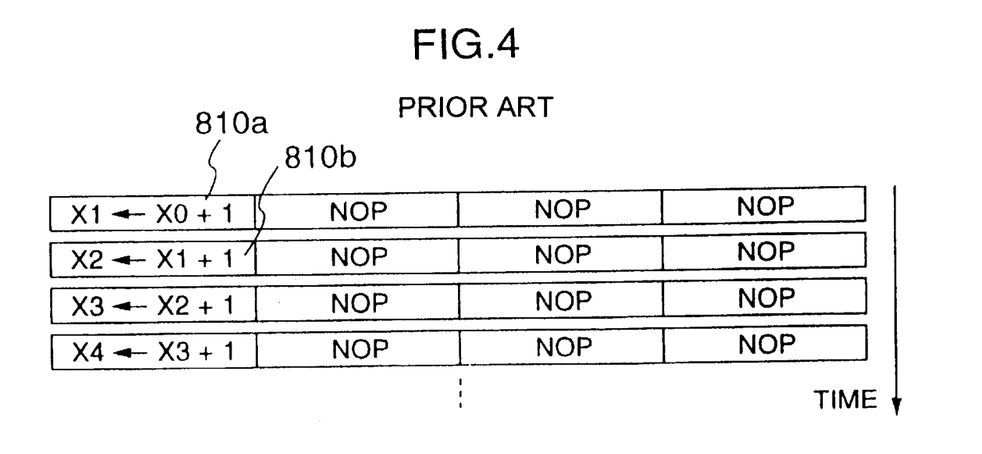
FIG. 4 is a view showing an example of a VLIW instruction corresponding to the art portion shown in FIG. 2.

FIG. 3 shows a VLIW system instruction (simply called a VLIW instruction) transformed from the program shown in FIG. 1. FIG. 4 shows a VLIW instruction transformed from the program shown in FIG. 2. These VLIW instructions enable the execution of the four processes at one time. In these Figures, one row corresponds to one VLIW instruction. These instructions are executed on time from top to bottom. The VLIW instructions shown in FIG. 3 are transformed from a portion of high parallel level (see FIG. 1). In these instructions, one instruction can execute four processes at a time. Hence, these VLIW instructions realize four times the performance of the conventional processor having only a sole processing unit.

On the other hand, the VLIW instructions shown in FIG. 4 are transformed from a process having a low parallel level (see FIG. 2). In these instructions, one instruction enables the execution of only one process at a time. Hence, even the processor employing the VLIW system (simply called a VLIW processor) for executing four processes at a time can realize only the same performance as the processor having only a sole processing unit. Since the instruction length has to be constant even in the portion having no process to be executed, it is necessary to insert a non-operational instruction (simply called an NOP) indicating no operation is provided. Hence, the instruction has a larger size than the content of the actual process.

When the VLIW processor executes a general program, an occupying rate of the NOP is made very high. It means that the NOPs occupy a main storage of an information processing apparatus having a VLIW processor (simply called a VLIW system) or much of an instruction cache memory (simply called a cache memory) located inside of the VLIW processor. The space of the main storage is wasted by the NOPs or the volume of the cache memory is made very large. This results in problems such as the performance of the VLIW processor is not made higher than it is expected, the VLIW system is made too costly, and the VLIW processor chip is overgrown and too much costly.

The problems about the VLIW processor are described in the writing "Basic Arrangement of Reconstructed VLSI Computer based on Execution Delay", Reports of Information Processing Society, Computer Architecture, Nos. 89 to 13, pages 87 to 93, Jul. 19, 1991, Information Processing Society.

The main storage of the VLIW system may be effectively used by avoiding the load of the NOP on the main storage. The technique of saving the memory volume by deleting the NOP from the main storage is briefly described in "A VLIW Architecture for a Trace Scheduling Compiler" IEEE, TRANSACTION ON COMPUTERS, VOL 37, No. 8, pages 967 to 979, August 1988.

In order to reduce the volume of the cache memory contained in the VLIW processor, there has been proposed a technique that takes the steps of compressing the instruction when it is stored in the cache memory, reading the compressed instruction out of the cache memory, and decompressing the instruction. This technique is briefly described in "Phillips Hopes to Displace DSPs with VLIW", MICROPROCESSOR REPORT, pages 12 to 15, Dec. 5, 1994, Micro Design Resources.

The system of deleting the NOP from the main storage makes it impossible to lower the cost and enhance the performance of the processor, because the volume of the cache memory contained in the VLIW processor is unchanged.

Further, the system of compressing the instruction when it is stored in the cache memory located inside the processor and decompressing the instruction when it is read out of the cache memory brings about a problem that a large loss takes place in a branch point. This occurs because the decompressing stage is inserted into a pipeline for executing the instruction and thus is located more deeply in the pipeline processing.

That is, one or two cycles are wasted by the decompression of the instruction together with a wire delay appearing inside of the processor chip. Hence, the pipeline for executing the instruction is extended by one or two stages. If the instructions are executed in proper order, the extension is often negligible. If the execution order of the instructions is changed by a branching instruction, a period when no instruction is executed takes place. In general, as the execution pipeline is deeper, such a period is longer.

This has led to a bigger problem in a processor such as a VLIW processor for executing instructions in parallel. Assuming that a period when no instruction is executed extends over two cycles, the conventional processor for executing only a sole process is disabled to execute only two processes in the worst case. However, the VLIW processor for executing four processes at a time is disabled to execute as many as eight processes in the worst case. As the processes to be executed in parallel are made more numerous, this loss is made worse.

In place of the reduced cache memory, the additional hardware for decomposing the instruction is required.

SUMMARY OF THE INVENTION

It is an object of the present invention to provide an inexpensive VLIW processor having a fast processing capability.

It is a concrete object of the present invention to provide an inexpensive VLIW processor that provides a reduced volume of a cache memory and a reduced chip size by improving the efficiency of the cache memory.

It is a further object of the present invention to provide a method for arranging a cache memory that is suitable to the VLIW processor.

It is another object of the present invention to provide a VLIW processor that has a fast processing capability without having to deepen the pipeline.

To carry out the objects, the processor according to the present invention includes plural processing units to be executed in parallel, the execution order of which processing units is controlled by a sole program counter, plural cache memories corresponding to the processing units, for storing the instructions executed by the processing units, a tag memory for storing address information of the instructions stored in the cache memories, and a storage control circuit for dividing the instruction into plural instruction fields corresponding to the processing units if the instruction specified by an address indicated by the sole program counter is read from the external and storing those instruction fields into the cache memories corresponding to the processing units.

According to the present invention, if the volume of the cache memory is reduced, the instruction read from the cache memory is executed without being decomposed. Hence, the pipeline for executing the instruction can be reduced in length, so that a loss taking place in executing a branch instruction is suppressed to be small.

Further, the occurrence frequency of the NOP is individual in each of the processing units. The NOP is not stored in the cache memory. Hence, the volume of the cache memory can be set according to the occurrence frequency of the instructions except the NOP. This makes it possible to enhance the using efficiency of the cache memory. This results in being able to achieve a higher processing performance at the same chip area.

As described above, according to the present invention, a compiler operates to give priority to allocation of any instruction except the NOP to a specific cluster. This operation makes it possible to vary the volume of the cache memory in each cluster, thereby improving the using efficiency of the cache memory. This results in being able to reduce the volume of the cache memory for realizing the same performance, thereby making the processor less expensive.

Further, it is possible to reduce the number of the circuits in the processor located from the cache memory to the processing unit through which the instruction read out of the cache memory pass. Hence, the instruction pipeline can be reduced in length. It leads to a smaller loss taking place in executing the branch instruction, thereby allowing the speed of the processor to be enhanced.

Since the cache memory is reduced in volume, the cache memory may be located close to each operating unit. Hence, the wiring area is reduced. It is effective in improving the operating speed.

The foregoing effective arrangement realizes an inexpensive VLIW processor having a fast processing capability.

DESCRIPTION OF THE PREFERRED EMBODIMENTS

An arrangement of a processor according to an embodiment of the present invention will be described with reference to FIGS. 5 to 9.

Figure 5:
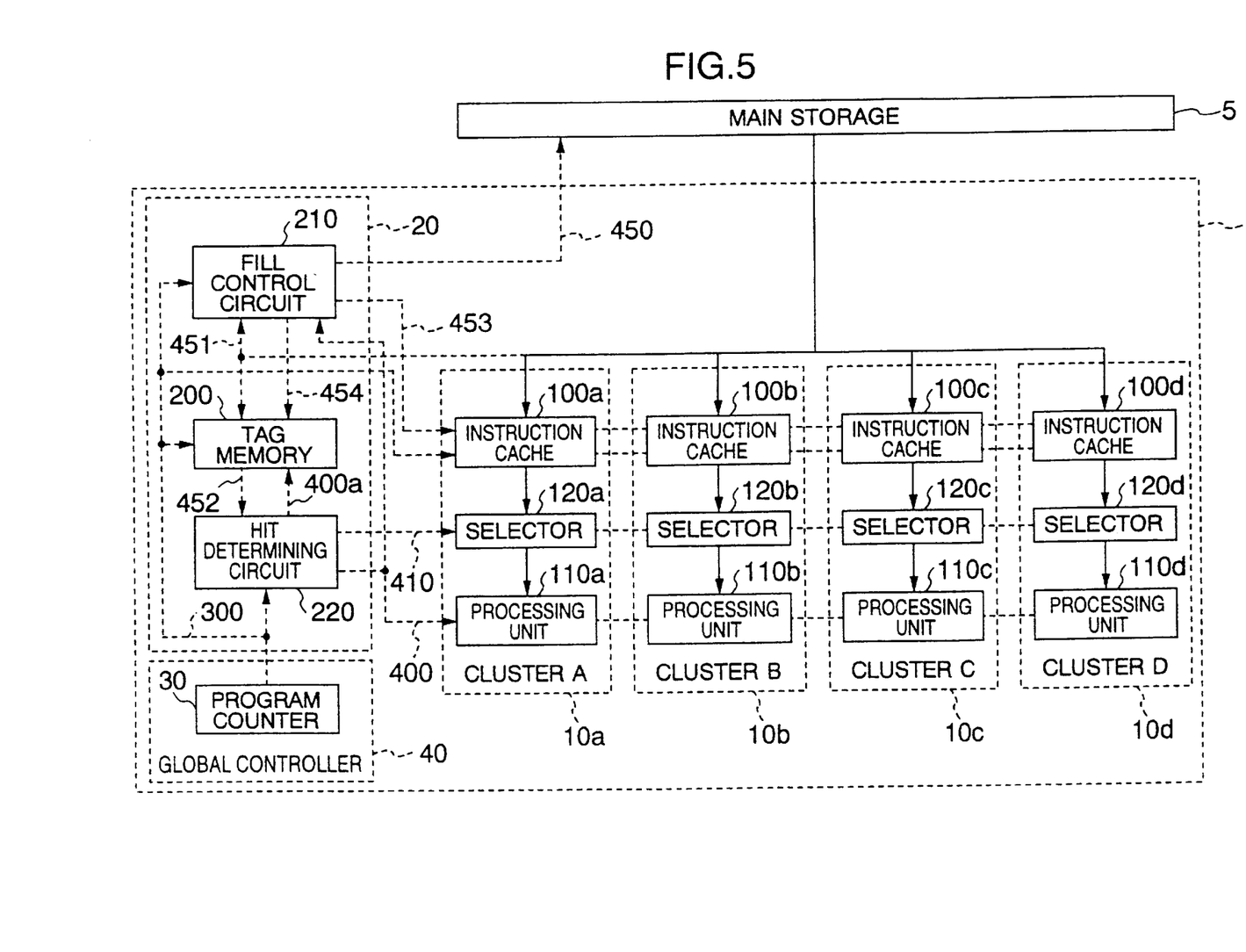
FIG. 5 is a block diagram showing an arrangement of circuits around a cache memory according to an embodiment of the present invention.

FIG. 5 is a block diagram showing an arrangement of a processor 1 and a connection of the processor 1 to a main storage 5 of an information processing apparatus using the processor 1. A numeral 5 denotes a main storage for storing instructions executed by the processor 1 and data required for the execution. The main storage 5 is located outside the processor 1. A connecting bus between the processor 1 and the main storage 5 has a 32-bit width. Numerals 10a to 10d denote clusters composing an essential portion of the processor 1. Each cluster is composed of an instruction cache memory 100 (simply called a cache memory) for storing an instruction, a processing unit 110 for executing various processes such as an operation, and a selector 120 for selecting an instruction to be executed by the processing unit 110. Each of the components in each cluster is distinguishably represented by adding a subscript such as a to d like the cache memory 100a (representing a cache memory in the cluster A). In this embodiment, the processor 1 is assumed to be a VLIW processor for executing four instructions at a time. Hence, four clusters A to D are prepared.

A numeral 20 denotes a cache control circuit. The cache control circuit 20 is composed of a hit determining circuit 220 for determining whether or not an instruction to be executed is stored in the cache memories 100a to 100d, a fill control circuit 210 for reading an instruction from the main storage 5 and saving the instruction in the cache memories 100a to 100d, and a tag memory 200 for storing information about the instruction saved in the cache memories 100a to 100d.

A numeral 40 denotes a global controller for controlling the overall operation of the processor 1. The global controller 40 provides a program counter 30 located therein. The program counter 30 is a pointer for pointing to a byte address of the coming instruction and is updated each time the instruction is executed. To access the instruction on the cache memory 100, the value of the program counter 30 is directly used.

The global controller 40 and the fill control circuit 210 both provide a sequencer inside of itself. The controller 40 and the circuit 210 are operated under the control of the sequencer.

Figure 6:
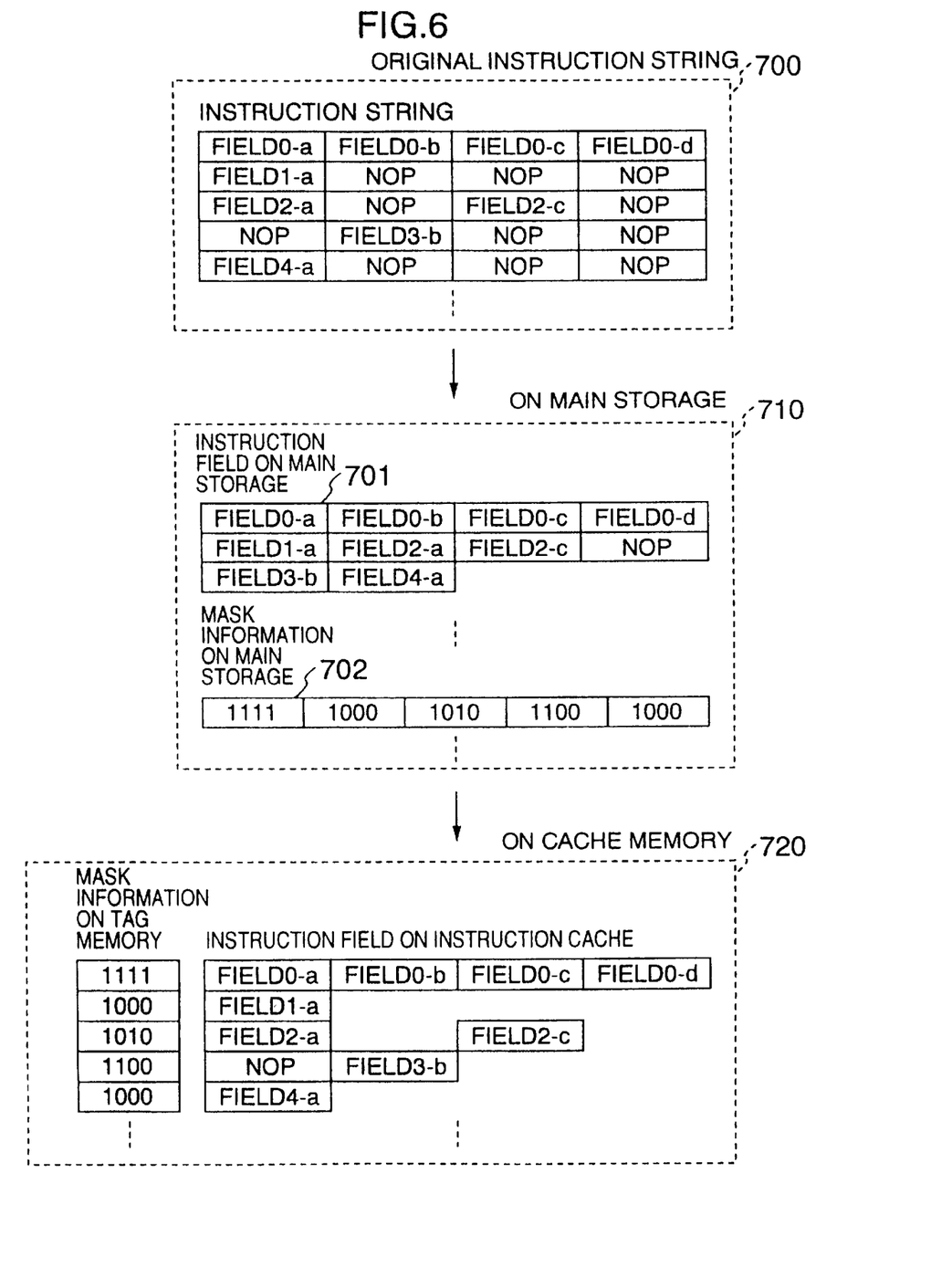
FIG. 6 is a view showing an example of a compressed instruction used in the embodiment of the present invention.

FIG. 6 is a view showing a composition of a VLIW instruction.

A numeral 700 denotes a VLIW instruction given when parallel processes are scheduled. The VLIW instruction 700 is composed of four instruction fields 701 corresponding to the clusters 10a to 10d in a one-to-one relationship. Each of the instruction fields N (N≧0)—a to d is an instruction field used in each of the processing units 10a to 10d. In this embodiment, one field consists of 32 bits (four bytes). A numeral 710 indicates a storing form of a compressed instruction string from which instruction fields for NOPs are deleted in the main storage 5.

A numeral 702 denotes a flag set indicating whether or not an NOP is given to an instruction field in each instruction, which is called mask information. The mask information 702 is provided in each VLIW instruction and has a four-bit composition, each bit of which corresponds to each of four clusters. In executing the instruction, the mask information allows the NOP to be inserted into the instruction field again. In the instruction field N-a for the cluster A, even the NOP is not deleted. This will be discussed below. A numeral 720 indicates a reading form of the VLIW instruction in the cache memory of the processor 1, which will be also discussed below in detail.

Figure 7:
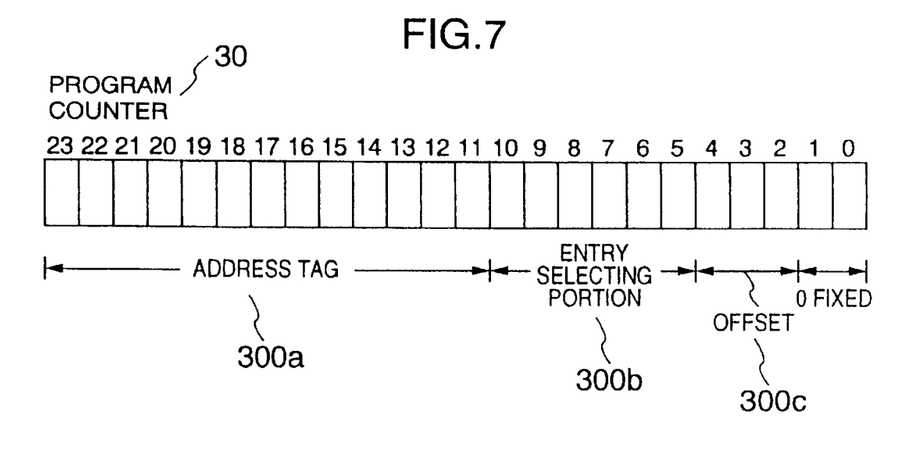
FIG. 7 is a view showing an example of a program counter used in the embodiment of the present invention.

FIG. 7 is a view showing an arrangement of the program counter 30, which has a 24-bit width and is divided into three fields. In FIG. 7, a numeral 300a denotes an address tag to be compared with address tag information 201 contained in a tag memory 200 (to be described below) when determining if the cache memory is hit. A numeral 300b denotes an entry selecting portion for selecting each entry of the tag memory 200 and the cache memory 100. A numeral 300c denotes an offset value of an instruction located in each entry. In this embodiment, the address tag 300a, the entry selecting portion 300b and the offset value 300c have a 13-bit width, a 6-bit width and a 3-bit width, respectively. The size of the instruction field is fixed to 32 bits and is ranged on the border of four bytes. The lowest 2 bits of the program counter 30 are constantly zero.

Figure 8:
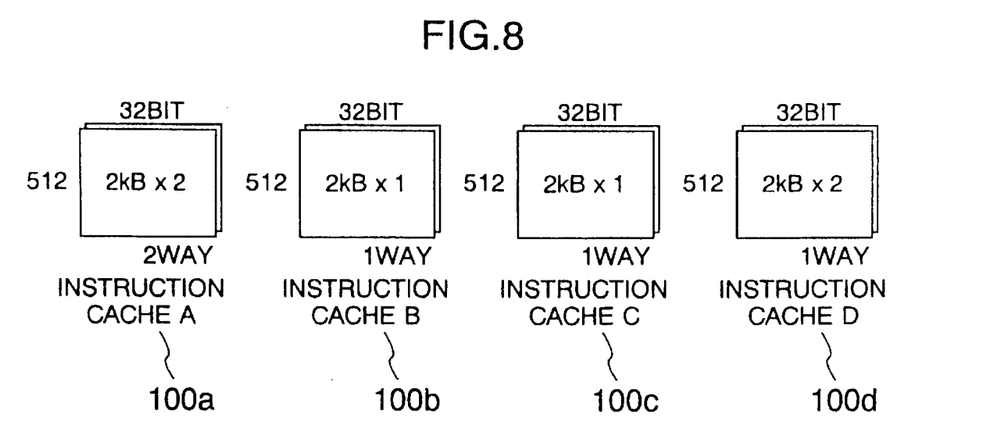
FIG. 8 is a view showing an arrangement of the cache memory.

FIG. 8 is a view showing each arrangement and volume of the cache memories 10a to 100d located in the clusters a to d. The cache memory 100a of the cluster A has a volume of 4 Kbytes. Each of the cache memories 100b to 100d of the clusters B to D has a volume of 2 Kbytes. The cache memory 100a employs a 2-way set associative system, while the cache memories 100b to 100d employ a 1-way set associative system. The volume of each set is equally 2 Kbytes.

The line size of each of the cache memories 100a to 100d is equal to the size of eight instruction fields (4 bytes×8=32 bytes). Each of the cache memories 100a to 100d is equally composed of 64 entries (2 kbytes/32 bytes). Each entry is specified by a common entry address. In this embodiment, the cache memory is composed of an address 512 and a read/write information and four bytes in width. This arrangement is used for avoiding the necessity of the 8 to 1 selectors when reading the instruction and the increase of the power consumption brought about if the read/write information width is set to 32 bytes suitably for the line size.

Figure 9:
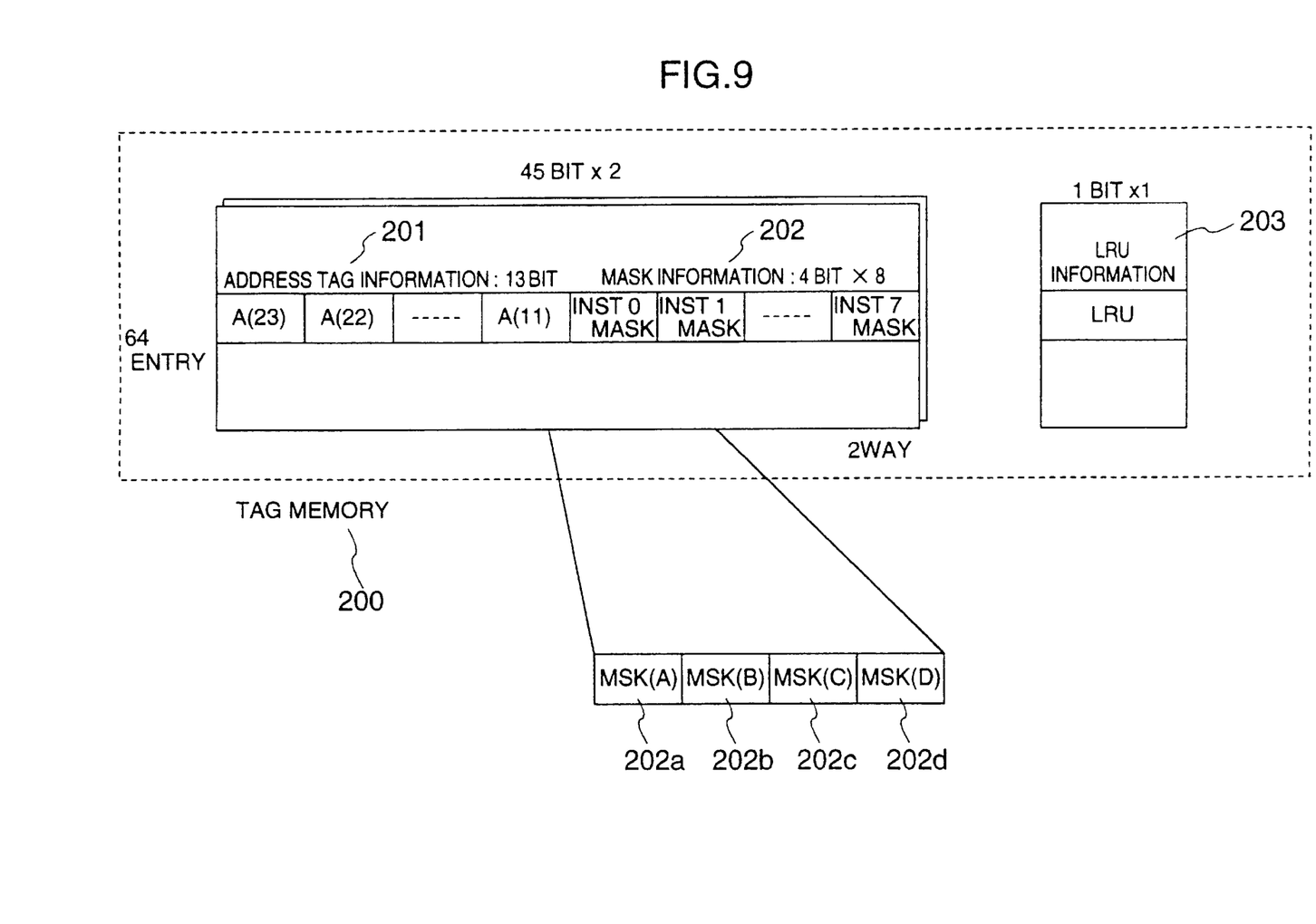
FIG. 9 is a view showing an arrangement of a tag portion contained in the cache memory.

FIG. 9 is a view showing an arrangement of the tag memory 200 commonly used in the clusters 10a to 10d. The tag memory 200 employs a 2-way arrangement corresponding to the cluster A. The tag memory 200 has 64 entries, each of which contains two areas for storing 13-bit address tag information 201 to be compared with the address tag 300a of the program counter 30 and mask information 202 for the mask information 702 stored in the main storage 5. To update the content of the cache memory, the Least Recently Used (called LRU) algorithm is used. For the algorithm, the tag memory 200 contains one-bit LRU information 203 for each of the necessary entries.

The mask information 202 is composed of the mask information 702 described with reference to FIG. 6 corresponding to eight VLIW instructions. In FIG. 9, inst0 to inst7 indicate any one of the eight VLIW instructions read in the tag memory 200. Each msk(x) denotes the mask information for a cluster x, where x denotes any of A to D. The mask information 202a for the cluster A is msk(A), which is also served as indicating if the overall set is effective. If msk(A) is 1, the set is effective, while if msk(A) is 0, the set is not effective.

Figure 11:
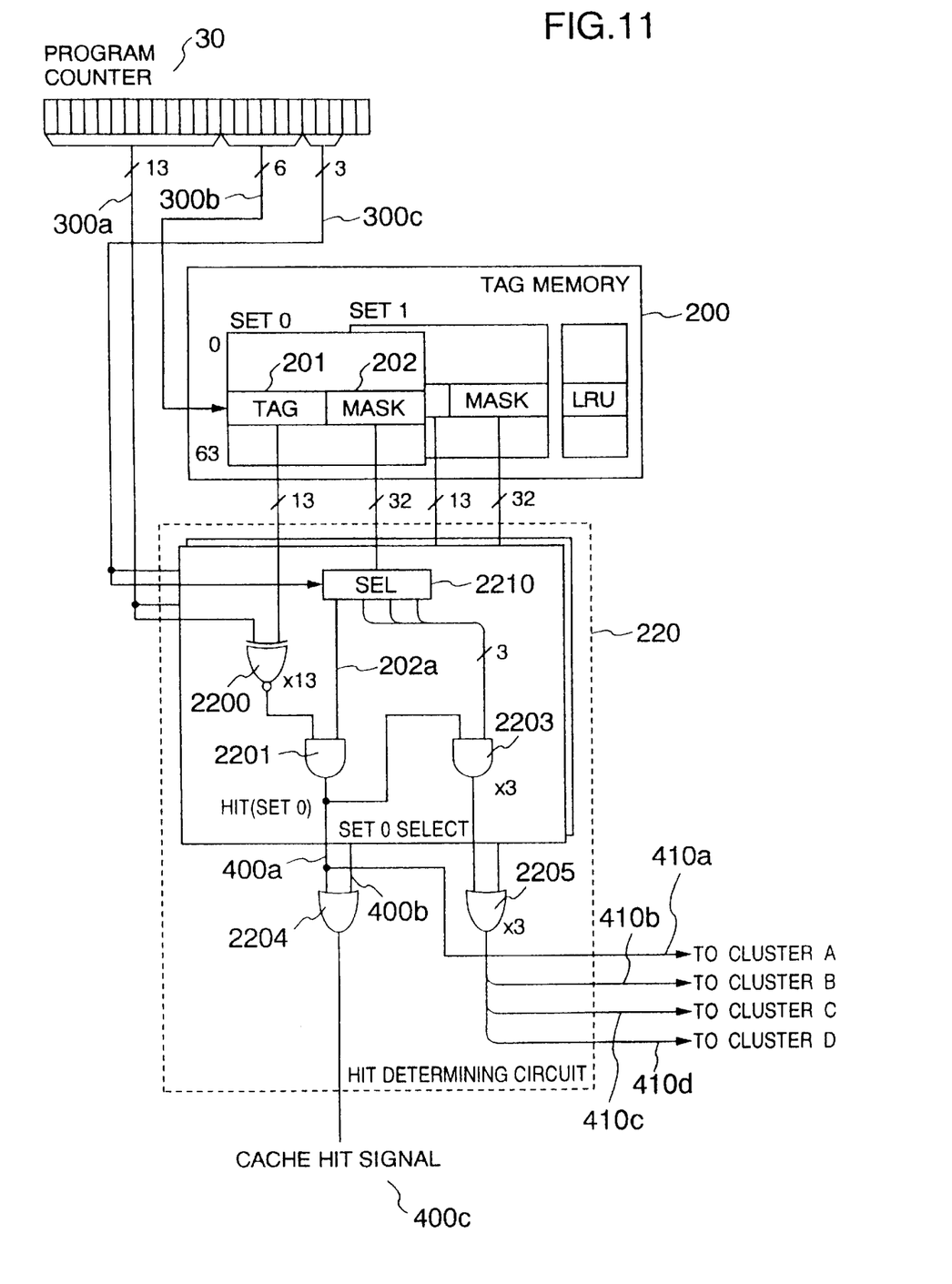
FIG. 11 is a block diagram showing an arrangement of a tag memory and a hit determining circuit.

FIG. 11 is a diagram showing an arrangement of the tag memory 200 and the hit determining circuit 220.

Figure 12:
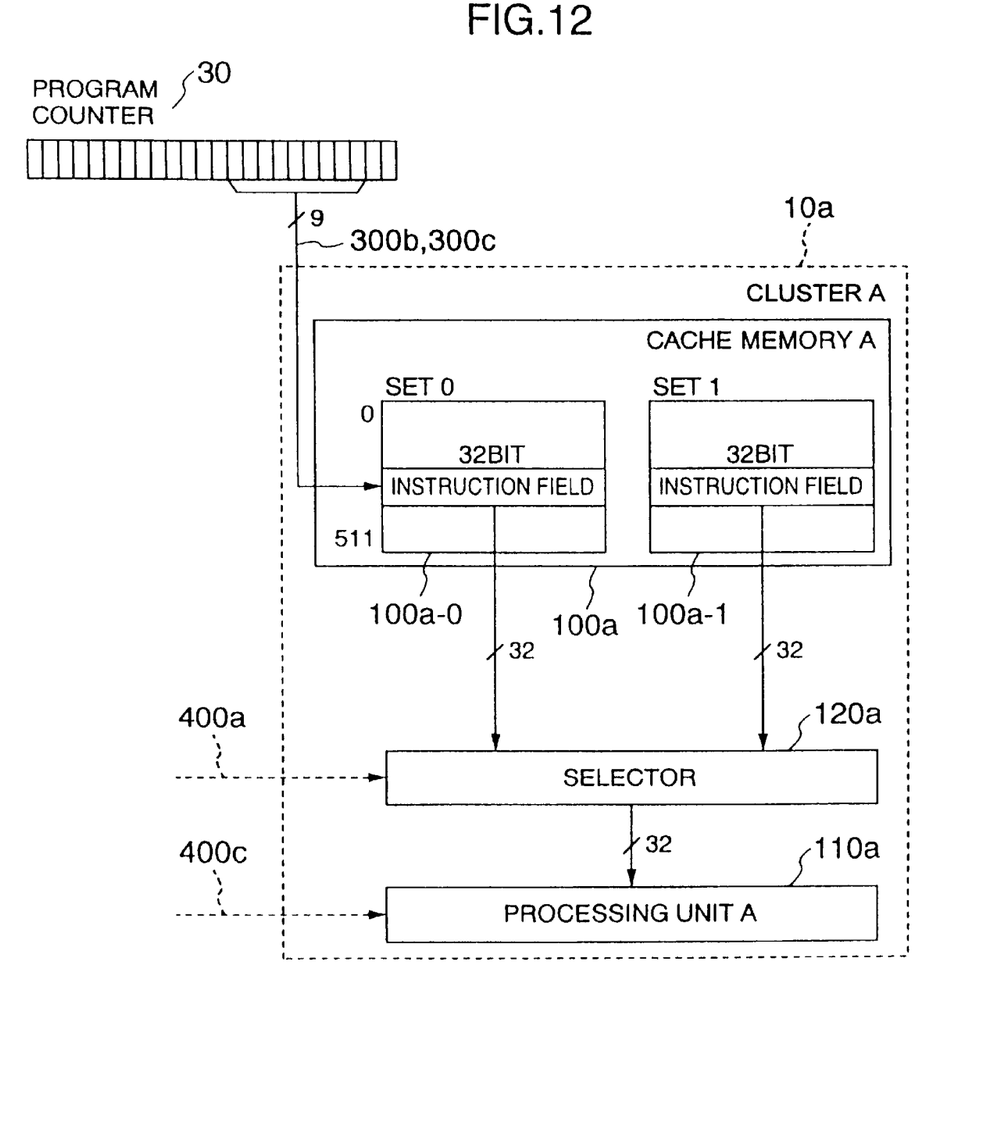
FIG. 12 is a block diagram showing an arrangement of a cache memory of a cluster A.

FIG. 12 is a diagram showing an arrangement of the cluster A. The selector 120a is used for selecting a necessary instruction from two pieces of data output from the cache memories 100a-0 and 100b-1 composed in a 2-way manner.

Figure 13:
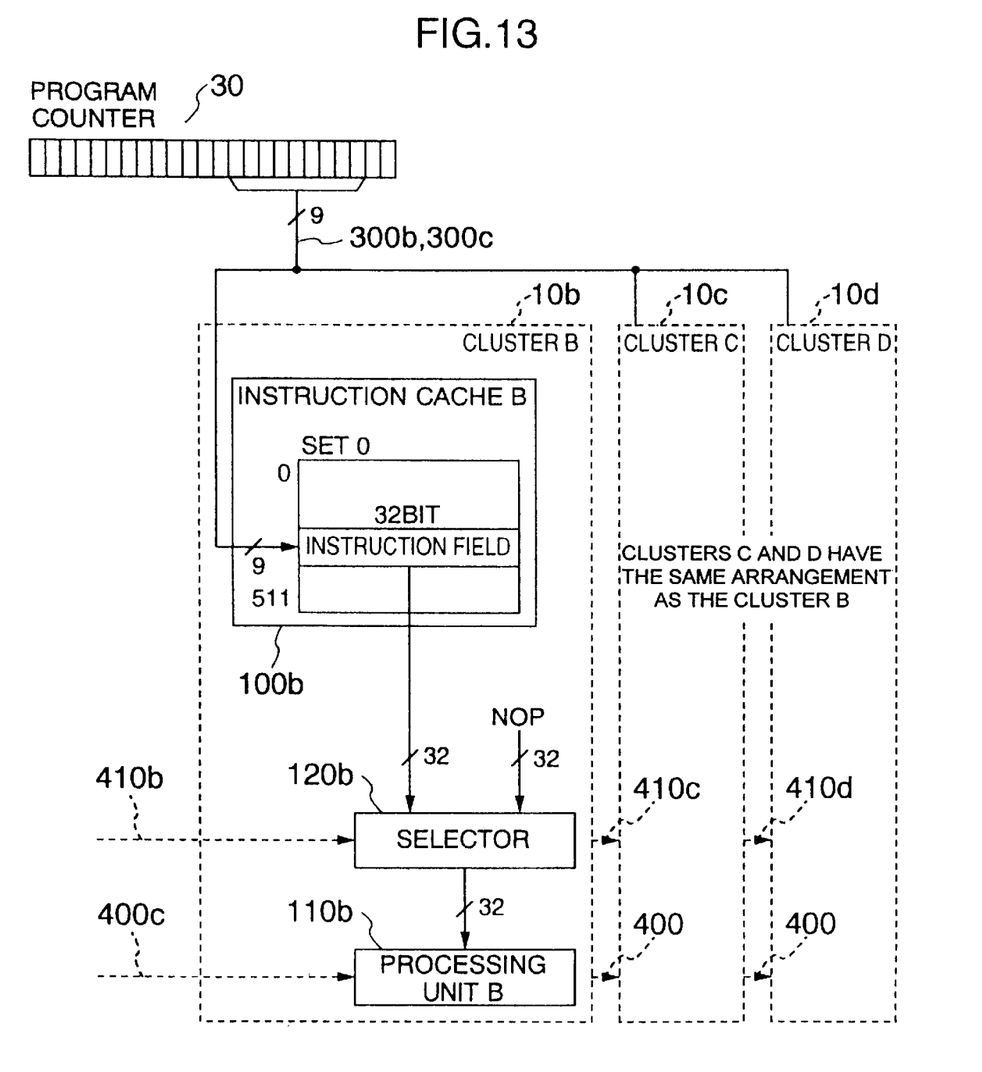
FIG. 13 is a block diagram showing an arrangement of a cache memory of clusters B to D.

FIG. 13 is a diagram showing arrangements of the clusters B to D. In FIG. 13, a selector 120b is used for selecting the data and the instruction field for the NOP read from a cache memory 100b composed in a one-way manner according to the corresponding mask information.

Figure 14:
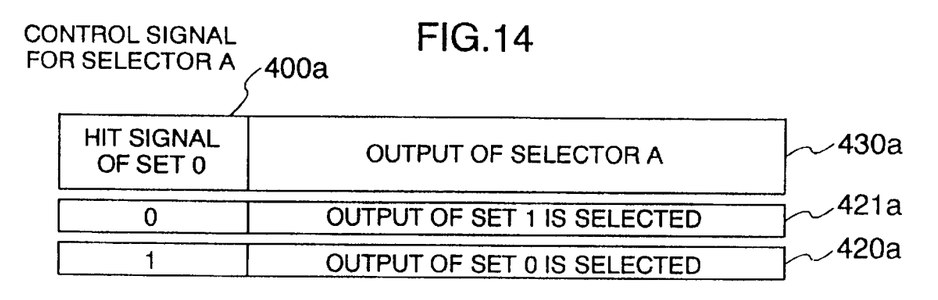
FIG. 14 is a table showing control signals for a selector of the cluster A.

FIG. 14 is a view showing the rules on which the selector 120a shown in FIG. 12 selects an output.

Figure 15:
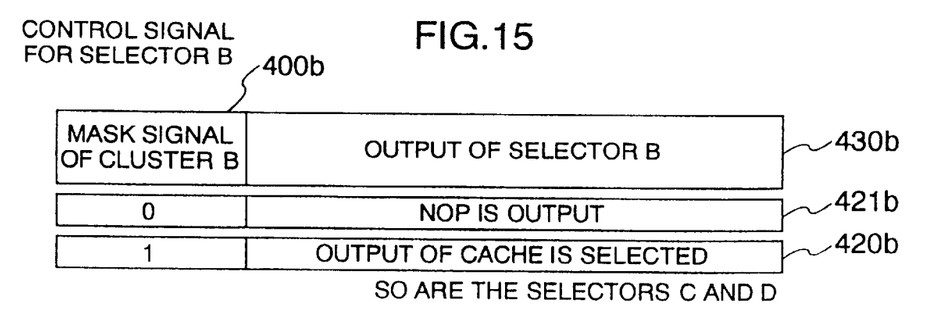
FIG. 15 is a table showing control signals for a selector of the clusters B to D.

FIG. 15 is a view showing the rules on which the selector 120b shown in FIG. 13 selects an output.

Before describing the operation of the processor 1, the description will be oriented to creation of the VLIW instruction through the compiler.

In general, when generating an instruction string, the compiler operates to allocate a process to each processing unit according to the rules for allocating a hardware resource contained by the compiler. In this embodiment, when the compiler generates the VLIW instruction, about the portion of low parallel level contained in a program, the rules for allocating the hardware resources are described so that a priority is given to allocation of a process to the processing unit 110a of the cluster A. A process is allocated to the processing units 110 as evenly as possible about a portion of high parallel level, and the allocated sub-processes are scheduled so as to achieve a high processing performance.

As a result, as denoted by 700 of FIG. 6, the cluster A may more probably contain an effective process than any other cluster. Conversely, the probability of locating the NOP in the instruction field is made lower in the cluster A. Hence, according to the parallel level, an instruction code size and a processing performance may be adjusted to a proper value.

Next, as denoted by 710 of FIG. 6, the compiler operates to delete the NOP from the instruction and compress the instruction in volume. At a time, the compiler also creates the mask information 702 required for decompressing the compressed instruction.

If the mask information 702 is 0, the NOP is in the corresponding instruction field 701. If it is 1, any other data except the NOP is in the field 701. In the cluster A, independently of the type of the instruction field (even if it is the NOP), the corresponding portion to the cluster A of the mask information is fixed to 1. As described above, the VLIW instruction is composed of four instruction fields. Hence, the mask information 702 consists of four bits.

According to the present invention, the NOP is deleted in the main storage 5. Hence, the address on the cache memory 100 indicated by the program counter 30 of the processor 1 has a different list from the address of the main storage 5 at which the instruction is stored. It means that the address translation is required when accessing the main storage.

This can be realized by the same technique as an address translation mechanism composed of a page table used when the processor realizes virtual storage and an address translation buffer called TLB. According to the present invention, the compiler operates to create an address transforming table for the page table on the main storage 5 during the compilation. The table is created from the relation between the instruction string 700 with the NOP contained therein and the instruction string 710 from which the NOP is deleted.

The address transforming buffer (not shown) is composed in the fill control circuit 210 as will be described below. In addition, when powered on, the buffer is required to be initialized (cleared to zero).

As noted above, the compiler serves to enhance a probability of locating a valid instruction field in the cluster A.

In this embodiment, therefore, the cache memory 100a of the cluster A10a holds a larger volume than the cache memories 100b to 100d of the other clusters. Concretely, the cache memory 100a has twice as large an associative degree as the other cache memories 100b to 100d.

Figure 10:
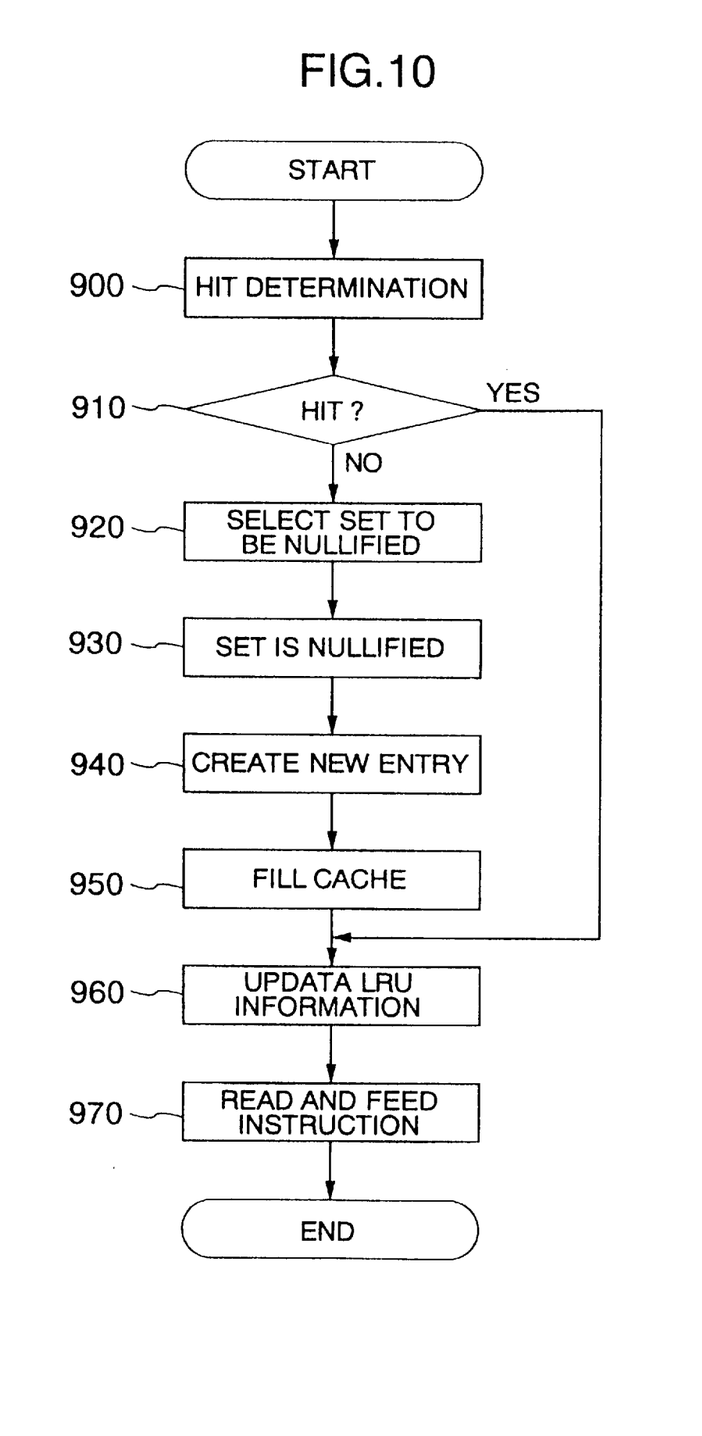
FIG. 10 is a flowchart showing an overall operating flow of the cache memory.

In turn, the description will be oriented to how the processor 1 executes the instruction. FIG. 10 shows a summary of an overall operating flow of the cache memory.

When the processor 1 executes the program, at first, the global controller 40 operates to access the cache memory 100 for obtaining an instruction required for executing the process by referring to a value of the program counter 30. In this case, at first, the hit determining circuit 220 operates to access the tag memory 20 for determining whether or not a necessary instruction is loaded in the cache memory 100, that is, whether or not the cache memory is hit (steps 900 and 910).

As a result, if the cache memory is hit, the hit determining circuit 220 operates to update the LRU information 203 of the corresponding entry in the tag memory 200 (step 960). The global controller 40 operates to read an instruction from the hit set and feed the instruction to each processing unit (step 970). Each processing unit knows the cache memory 100 is hit in response to the hit signal 400 and then starts to execute the instruction.

The procedure for determining if the cache is hit (steps 900 and 910) will be described with reference to FIGS. 11 to 15.

As mentioned above, when the processor 1 executes the program, at first, the global controller 40 operates to select one entry of 64 entries stored in the tag memory 200 by using a value of the entry selecting portion 300b contained in the program counter 30 and then read the address tag information 201, the mask information 202, and the LRU information 203 from the tag memory 200. The tag memory 200 is composed in a two-way manner. Two sets of the address tag information 201 and the mask information 202 are read. The global controller 40 operates to access the same entry of the cache memory simultaneously.

Next, the hit determining circuit 220 operates to compare the address tag information 201 read out of the tag memory 200 with the address tag portion 300a of the program counter 30 at each set for checking if both are matched to each other. About the corresponding number of the outputs of an EX-NOR gate 2200 to the digit for a width to be compared (13 in this embodiment), both are matched if all the outputs are one.

The selector 2210 simultaneously operates to select the mask information 202 of the concerned VLIW instruction from the mask information 202 (inst0 to inst7) for eight VLIW instructions read at each set. If the compared result and the mask information 202a of the selected mask information 202 are both one, it means that the concerned set is hit through the effect of an AND gate 2201. Hit (set0) 400a or 400b is made 1.

If any one of two sets is hit, an OR gate 2204 is activated so that the cache memory is hit. The information about the hit set is reported to the cluster A through the hit (set0) 400a. If the cache is hit, the mask information 202b to d of the hit set is made effective by hit (set0) 400a. The mask information 202b to d are reported to the clusters B to D through lines 410b to d.

A value of 9 bits composed by connecting the entry selecting portion 300b of the program counter 30 with the offset 300c is given to the cache memories 100a to 100d. In the cluster A, the instruction fields are read from two sets at a time. The selector 120a operates to select any one of the instruction fields according to the hit (set0) indicating that which one of the sets is hit. The selecting rules are shown in FIG. 14.

The cache memories 100b to 100d send the instruction fields read from one set and the processing code for the NOP to the selectors 120b to 120d. The selectors 120b to 120d are operated according to the effective mask information 410bto 410d. The selecting rules are indicated as shown in FIG. 15. The processing code is predetermined. Hence, it may be realized by a connecting logic.

As described above, the instruction read from the cache memories 100b to 100d is given to the processing unit only through one stage of the selectors 120b to 120d. Hence, the necessary number of the processing clocks is reduced and the pipeline is made shorter.

Next, the description will be oriented to the operation if the cache memory is miss.

If the cache memory is mishit, the mishit is transmitted from the hit determining circuit 220 to the fill control circuit 210 through a hit signal 400c. Then, the fill control circuit 210 starts its operation. At a time, the entry selecting portion 300b and the offset 300c of the program counter 30 are given to the cache memories 100a to 100d. Then, the contents are read from the cache memories 100a to 100d. Concurrently, the mishit is transmitted through a hit signal 400c to the processing units 110a to 110d, so that these processing units are stopped. Hence, no problem takes place.

Next, the fill control circuit 210 operates to read another VLIW instruction and the corresponding mask information from the main storage 5 and then save them in the concerned entries of the cache memories 100a to 100d and the tag memory 200. This operation will be described below.

At first, it is checked if there is secured such an empty area as allowing a new instruction to be saved in the concerned entries of the cache memories. About the concerned entries in the tag memory 200, all the mask information msk(A) of the inst0msk to inst7msk of any one of the sets are checked. If all the mask information msk(A) are made zero, the concerned sets of the concerned entries are empty. If no empty area is left, the fill control circuit 210 operates to invalidate some sets of the concerned entries for securing an empty area. This work is called nullifying the cache.

When nullifying the cache, the fill control circuit 210 operates to select a data set to be nullified (step 920) and then nullify the selected set entry (step 930). The nullifying method will be discussed below.

If an empty area is left or created by nullifying the cache, the fill control circuit 210 operates to store the address tag information 201 in the tag memory 200 through a line 454 and create a new entry (step 940). Then, at a step 950, the fill control circuit 210 concurrently reads the mask information 702 for eight instructions in a manner to suit to a bus of a 32-bit width. The fill control circuit 210 then stores the read mask information 702 in the tag memory 200 and the fill control circuit 210 itself. Next, the output VLIW instruction 701 contains the eight successive instruction according to the mask information for the eight instructions.

When the fill control circuit 210 reads the VLIW instruction 701, the fill control circuit 210 operates to analyze the mask information 702 and issue a write signal to the concerned cache memory based on the analyzed result. An instruction feeding path led from the main storage 5 is 32 wide enough to make it equal in size to the instruction field. Hence, the specification of the cache memory on which data is to be written is allowed to be executed only by controlling each write signal of the cache memories 100a to 100d.

If both of the two sets are left empty or nullified for leaving them empty, which of the sets where the instruction is to be stored is predetermined.

As mentioned above, the processor contains the processing code for the NOP instruction. Hence, the NOP instruction is not required to be re-stored. If each VLIW instruction contains an instruction field for the NOP instruction, the fill control circuit 210 disables to write the instruction to the cache memory according to the mask information.

As a result, the up to eight VLIW instructions are stored in the cache memory located in the corresponding cluster to the instructions with each VLIW instruction located in the corresponding instruction field.

According to the present invention, as mentioned above, since the NOP is deleted from the instruction string 710 stored in the main storage 5, the address of the instruction stored in the cache memory indicated by a value of the program counter 30 has a different list from the address at which the instruction is stored in the main storage 5. In accessing the main storage 5, therefore, the address is transformed through the effect of the address transforming buffer contained in the fill control circuit 210 and the address transforming table stored in the main storage 5.

The fill control circuit 210 operates to transform an address of a value of the program counter 30 through the effect of those mechanisms, read an instruction indicated by the transformed address after the main storage 5 through a path 450, and then save the instruction in the cache memory 100. On the path 450, a control signal for the main storage is contained in addition to the transformed address. The subsequent process is the same as the process executed at the hitting time.

Some of the foregoing processes are allowed to be executed in parallel or re-ordered. For example, it is possible to update the LRU information (step 960) and feed the instruction (step 970) at a time.

Next, the description will be oriented to the foregoing method for selecting a set to be nullified. Selection of the set to be nullified (step 920) is executed by using the LRU information 203. It indicates which of the sets is recently used. The hit determining circuit 220 stores "0" if the set 0 is recently used or "1" if the set 1 is recently used. That is, the value of the hit signal 400a of the set A is written to the LRU information 203 of the corresponding entry when hitting the cache.

As a concrete nullifying procedure, at first, the fill control circuit 210 operates to check if a new instruction is input to the set of the cache memory having an old access history indicated by the LRU information 203 of the entry. If an AND of each bit of "the mast information of the new instruction" and "the mast information of the instruction having an old access history indicated by the LRU information 203" is made zero, the new instruction can be stored in that set of the cache memory. Then, the set having the old access history indicated by the LRU information 203 is nullified. To nullify the set, the corresponding entry of the tag memory 200 and the mast information of the corresponding set, that is, the msk(A) 202a of inst0 to inst7 are made zero.

As a result of checking it, if no new instruction can be input to the set, the same checking is done for the set having a new access history indicated by the LRU information 203. If the new instruction can be input to the set, the set having the new access history indicated by the LRU information 203 is nullified. If no new instruction can be input to the sets though both of the sets are nullified, both of the sets are nullified.

To nullify the sets, the fill control circuit 210 operates to set to zero all the corresponding mask(A) 202*a* to the cluster A of inst0mask to inst7mask contained in the mask information of the set selected in the tag memory 200. If any one of the sets is nullified, a new instruction is read in the set, with the mask information being reset. Hence, it is not necessary to set such information to zero. When powered on, the mask information 202 is initialized (cleared to zero) for nullification in advance.

In the foregoing description, the processing unit 110*a* is arranged and controlled so that effective instructions are focused thereon. Of course, it is not limited to this arrangement and control.

Further, in this embodiment, the cache memory 100*a* has twice a volume of each of the other cache memories. However, it is not limited to the volume. The cache memory may be arranged in a manner to suit to a rate of concentrating the instructions to a specific processing unit.

What is claimed is:

1. A processor comprising:

two or more processing units whose execution sequence is controlled by a sole program counter and are allowed to execute in parallel;

two or more cache memories for storing an instruction to be executed by said processing units, said cache memories corresponding to said processing units, respectively;

a tag memory for storing address information of said instruction stored in said cache memories; and storage control circuit for storing instruction fields divided from said instruction in the cache memories corresponding to said processing units if the instruction specified by an address indicated by said sole program counter is read from an external memory; for reading storage information indicating which of said processing units corresponds to the instruction fields divided from said instruction when reading said instruction; for storing said storage information in said tag memory in association with the corresponding address information for said instruction; and for controlling storage of each of said instruction fields in the cache memory corresponding to a processing unit which executes each of said instruction fields according to said storage information.

* * * * *